United States Patent [19]
Gillett

[11] Patent Number: 6,055,359
[45] Date of Patent: Apr. 25, 2000

[54] DC MOTOR DRIVE CONTROL WITH IMPROVED CURRENT SENSING

[75] Inventor: Jimmie D. Gillett, Dallas, Tex.

[73] Assignee: Polyspede Electronics, Dallas, Tex.

[21] Appl. No.: 09/099,672

[22] Filed: Jun. 18, 1998

[51] Int. Cl.[7] .................................................. H02P 7/29
[52] U.S. Cl. ........................................ 388/819; 318/432
[58] Field of Search .................................. 318/244, 245, 318/246, 432, 433; 388/801, 803, 804, 809, 811, 816, 819, 828, 829, 830, 831

[56] References Cited

U.S. PATENT DOCUMENTS

| | | | |
|---|---|---|---|
| 3,095,534 | 6/1963 | Cockrell . | |
| 3,911,341 | 10/1975 | Carlson et al. | 388/829 |
| 4,195,254 | 3/1980 | Gurwicz et al. | 388/804 |
| 4,471,278 | 9/1984 | Matouka | 318/561 |
| 4,488,096 | 12/1984 | Cap et al. | 388/814 |
| 4,673,851 | 6/1987 | Disser | 318/831 |
| 4,677,356 | 6/1987 | Tsuneda et al. | 318/258 |
| 4,683,409 | 7/1987 | Boillat | 318/686 |
| 4,700,116 | 10/1987 | Inoue et al. | 318/254 |
| 4,873,453 | 10/1989 | Schmerda et al. | 307/130 |
| 4,980,838 | 12/1990 | Daggett et al. | 318/568.16 |
| 5,089,761 | 2/1992 | Nakazawa | 318/811 |
| 5,889,922 | 3/1999 | Bufe et al. | 388/804 |

*Primary Examiner*—Bentsu Ro
*Attorney, Agent, or Firm*—Robert C. Klinger

[57] ABSTRACT

A PWM DC motor control circuit having improved current sensing. A power switching device controls the DC motor in a common drain connection, whereby armature current sensing is achieved at the negative side of the power switching device. The control for the power switching device and the PWM control circuit are both referenced to the negative rail, and thus do not float or move up and down with the motor modulation. An RC combination is controllably and synchronously switched across the current sense resistor to produce a voltage Ve across the RC combination when the motor power switch is on. This RC combination provides an average voltage of Ve to the PWM control that provides a waveform that replicates very nearly the armature motor current. The DC motor control current has improved immunity to noise generated by the PWM control and other ambient noise.

13 Claims, 4 Drawing Sheets

DC MOTOR DRIVE CONTROL WITH IMPROVED CURRENT SENSING

FIELD OF THE INVENTION

The present invention is generally related to a DC electric motor control circuit suited to drive a treadmill and the like, and more particularly to a pulse width modulated (PWM) motor drive control circuit with improved armature motor current sensing to reduce the effects of noise generated by the high frequency PWM control signal.

BACKGROUND OF THE INVENTION

The treadmill one type of exercise equipment suitable for exercise, as well as for electro cardiographic or other medical evaluation. A typical treadmill comprises an endless belt extending between two parallel spaced rollers. A support member typically underlies the upper span of the belt. An electric motor drives one of these rollers to advance the belt over the support at a selectable speed. DC motors are usually implemented in treadmills because they are suited to be operated over a wide range of speeds.

The DC motor is typically driven and controlled by a motor drive control circuit. A DC voltage is controllably applied across the armature of the DC motor to selectively establish the speed of the motor. In most forms of motor drive controls, current sensing of the motor, namely, the current being conducted through the armature of the motor, is sensed to ascertain and controllable establish and maintain the speed of the motor. It is necessary to maintain a controllable and constant belt speed, especially during variations of the load applied or removed from the motor, i.e., a person entering, using, and exiting the treadmill. It is important that the motor control be capable of responding quickly to transient loads. Therefore, it is important to sense the current through the armature of the DC motor, especially during transient conditions to compensate for the voltage drop across the armature of the DC motor. Noise from the associated DC motor and other circuitry is a concern when sensing motor current.

Referring to FIG. 1, there is shown a simplified version of a prior art DC motor drive control 10 wherein the motor (load) 12 is connected to the source terminal of a power switching device 14, shown in this embodiment as the source terminal of a field effect transistor (FET). A pulse width modulation (PWM) control circuit 16 is seen to drive the gate of the FET to control on/off time i.e. duty cycle, and is referenced to the source terminal of the FET as well, and thus, this configuration is known as a "common source connection". In this common source connection, the control circuit 16 "moves" up and down with the motor modulation. This undesirably results in "noise" paths such as via stray capacitance, radiation, etc. which can degrade performance and cause irregularities of the DC motor 12 depending upon the installation and surrounding environment. This common source connection further necessitates that any external control, such as a potentimotor varying the control 16 is "hot" and is subject to motor modulation.

Referring now to FIG. 2, there is generally shown at 20 an alternative prior art DC motor drive control circuit having a "common drain connection". In this embodiment, the source of a power switching FET 22 and a PWM control circuit 24 are at a common ground, i.e., the negative rail of the DC voltage source provided by the bridge. The PWM control circuit 24 in this configuration driving motor 26 is influenced by noise to a much lesser extent than that of circuit 10 shown in FIG. 1. If this configuration is employed in a control drive using bridge rectification, as shown, in a common scenario the "common" will be modulated with a rectified sign wave corresponding to the AC source frequency, usually 50 or 60 Hertz, which is a much less noise problem than the high frequency problem in FIG. 1. One such embodiment of this common drain connection in a DC motor drive control is depicted in U.S. Pat. No. 5,351,336 and U.S. Pat. No. 5,367,600. The disadvantage of this circuit is that current sensing is obtained at the drain level. The disadvantage of this circuit is that it requires an optocoupler and two separate isolated ground levels, a sensing ground and a power supply ground.

The control circuit 20 of FIG. 2, however, induces another problem. Referring to FIG. 3, there is depicted the control circuit 20 including the power switch 22 shown as S1, typically comprised of a FET, illustrating the voltage Vs produced at node N by the power switch S1, and the resulting motor voltage Vm. Notably, the motor voltage Vm is continuous, i.e., it does not go to zero when switch S1 is on in the short time frame at the high switching frequency. The motor voltage Vm in this embodiment is sustained by the back EMF of the motor 26 as represented by the armature motor current Im. The diode D1 is a free wheeling diode which provides a path for the current when the switch S1 is in the off position. Note, however, that the FET current Is is discontinuous and "pulses" at the modulation frequency. Given that the ideal location to sense the motor armature current is referenced to the common or negative rail, this drive circuit is problematic in that the current sensed in the FET source of S1 does not adequately represent armature motor current, but, rather represents "peak" motor current. This control circuit provides the advantage that the PWM control circuit 24 is referenced at the negative rail, but has a disadvantage in that there is no way to adequately sense armature motor current.

There is an desired an improved DC motor drive control circuit having a common drain connection further including the ability to effectively sense or replicate armature motor current at the FET source.

SUMMARY OF THE INVENTION

The present invention achieves technical advantages as a DC motor drive control circuit having a current sense resistor coupled between the source of the power switch and the negative voltage rail, and further including an R/C parallel combination being selectively and controllably connected across the current sense resistor to ascertain and estimate the motor armature current when the power switch is in both the on and off position. The present invention provides current sensing through the armature of the DC motor in a common drain connection of a power switch. The capacitor of the RC combination stores the voltage generated across the current sensing resistor when the switch is in the off position, and provides this voltage to the pulse width modulation control circuit for current sensing and control. The resistor of the R/C parallel combination establishes an RC time constant which controls the decay of the voltage when the power switch is in the off position. The resistance of this resistor can be adjusted to adjust the voltage ripple across the resistor, whereby the resulting waveform can be shaped to achieve different characterizations of the current profile. Since the ripple is also a function of the PWM switching frequency, a resulting waveform can be achieved to replicate very nearly the armature motor current. The RC decay can also be selectably controlled, and thus emphasis can be changed for current limit from low to high speed.

The present invention includes a control circuit for energizing a DC motor having a motor armature connected between a first terminal and a second terminal. The control circuit includes a DC armature voltage source having a positive rail and a negative rail, wherein the positive rail is coupled to the first terminal of the DC motor. A first switch is connected in series with the motor armature, the first switch having a first contact connected to the second terminal of the DC motor, the switch also having a second contact. A pulse width modulator is operatively coupled to the first switch and controls the on and off time (duty cycle) of the first switch to control the average voltage across the motor armature, wherein the pulse width modulator has a current-sensing input. A second switch is provided having a first contact coupled to the first switch second contact. The second switch also has a second contact. The second switch is also controlled by the pulse width modulator preferably in synchronism with the first switch. A current sense resistor is coupled between the first switch second contact and the voltage source negative rail A sensing means, preferably comprised of an RC parallel combination comprising a resistor and a capacitor, has a first end coupled to the second switch second contact. The other or second end of the sensing means, preferably being the RC parallel combination, is coupled to the voltage source negative rail. The first end of the RC parallel combination is also coupled to the current sensing input of the pulse width modulator.

The voltage across the RC parallel combination is provided to the current sensing input of the pulse width modulator, even when the first switch, namely, the power switch, is in the off position to very nearly replicate the armature motor current. Preferably, the pulse width modulator turns the first switch on and off in synchronism with the second switch, wherein the second switch is essentially a change transfer switch selectively coupling the RC combination across the current sensing resistor. Both the first switch and the second switch are preferably comprised of an FET, but also could comprise of a silicon controlled rectifier (SCR), or a transistor as desired. In the case of using FETs the source terminal comprises the second terminal of the first switch, and the drain comprises the first terminal to provide a common drain connection. A pulse width modulation control signal generates a variable PWM control signal that is coupled to the current sensing input of the pulse width modulator to control the speed of the motor. The voltage across the RC parallel combination is summed with the variable PWM control signal.

DESCRIPTION OF THE PREFERRED EMBODIMENT

Figure 4:
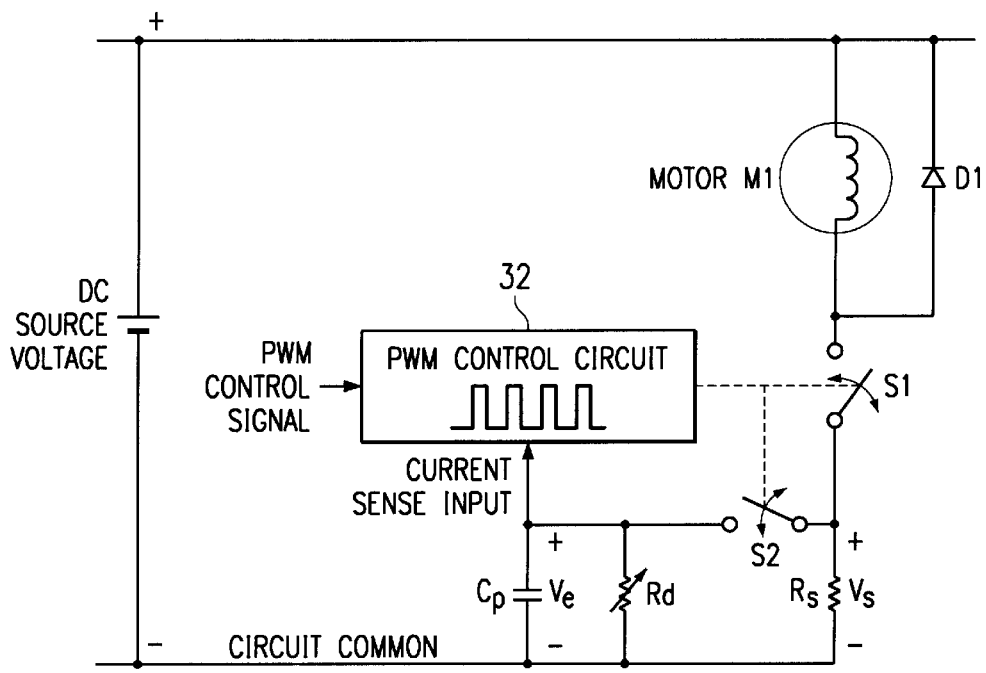
FIG. 4 is a schematic of a DC motor drive control circuit according to the present invention including current sensing at the switch source when the power switch is arranged in the common drain configuration.

Referring now to FIG. 4, there is shown at 30 an improved pulse width modulated DC motor drive circuit according to the preferred embodiment of the present invention. In this circuit, a current sense resistor Rs is coupled in series with the source of the power switching element S1 to allow sensing the armature current of the motor M1 at the source of the switching element, and with reference to the circuit common being the negative rail of the DC source voltage. Here, the current sense resistor Rs samples the FET current at the source of switch S1 when switch S1 is on, and another second switch S2 is coupled to resistor Rs and switched in synchronism with switch S1 to produce the same voltage across the parallel RC combination shown as Rd and Cp.

Figure 5:
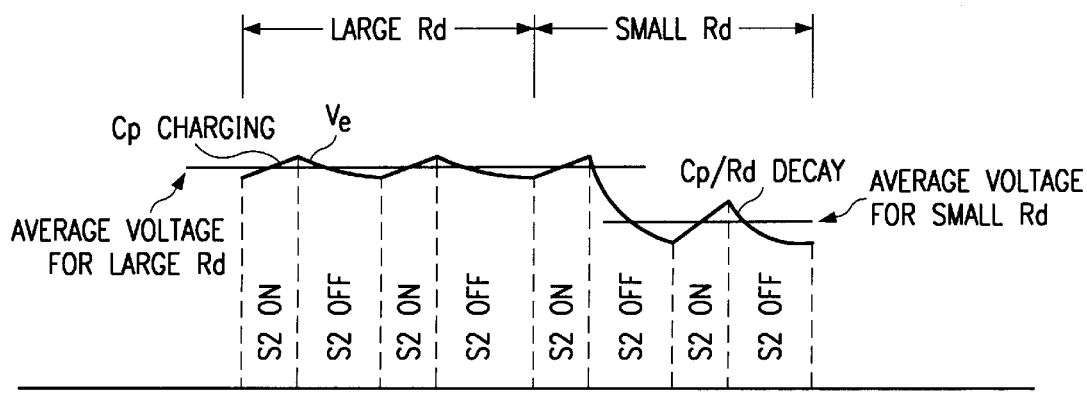
FIG. 5 is a graph of the voltage Ve across the Cp/Rd parallel combination as a function of the state of the switch Ss.

Referring to FIG. 5 in view of FIG. 4, this result is graphically illustrated. When power switch S1 is in the on position as controlled by the pulse width modulation control circuit 32 which controls the switch duty cycle, the voltage Ve across parallel resistor/capacitor combination of Rd/Cp charges to the peak voltage Vs established across the current sense resistor Rs. When the power switch S1 is in the off position, and thus the second switch S2 is also off, the resistor/capacitor combination of Rd/Cp discharges according to the RC time constant established by the values of Rd/Cp. This charging/discharging sequence according to the switch duty cycle is illustrated in FIG. 5. It can be seen that the voltage Ve across the resistor/capacitor combination of Rd/Cp as a function of the state of switch S2 provides an average voltage Vs across the Rd/Cp combination that is very close to the peak voltage Vs across the current sense resistor Rs. This voltage Ve across Rd/Cp, provides current sensing which is input back to the current sensing input of pulse width modulation control circuit 32 as feedback for PWM control of motor M1.

As shown in FIG. 5, with the small proportionate value of resistor Rd, a greater voltage ripple is achieved. The significance of this is that the resulting waveform can be shaped to achieve different characterizations of the armature motor current profile. Since the voltage ripple is also a function of the PWM frequency, a resulting waveform can be achieved to replicate very nearly the armature motor current. The RC decay can also be controlled by adjusting the value of resistor Rd, and emphasis can be changed for current limit from low motor speed to high motor speed since speed is proportional to voltage and hence PWM.

The net result of the circuit 30 according to the preferred embodiment of the present invention is that armature current sensing can be achieved in the negative side of the power switching device, namely S1, and tailoring can be implemented to shape the response for current limiting. The present invention allows the power control switch S1 to be arranged in the common drain connection, which is desirable since the control to the gate of switch S1 is not modulated at the full supply voltage and thus does not float with the voltage across the motor armature. The control circuit 30 has a further advantage in that armature motor current sensing is provided in the negative side of switch S1, and can be tuned to accurately represent the armature motor current even when the power switch S1 is in the off position, whereby the average voltage Ve across the RC combination Rd/Cp closely resembles the armature motor current across motor M1. The combination of transfer switch S2 and the RC combination Rd/Cp provides an average voltage, as shown in FIG. 5, that is used by power control circuit 32 as feedback for proper PWM control of DC motor M1.

Figure 6A:
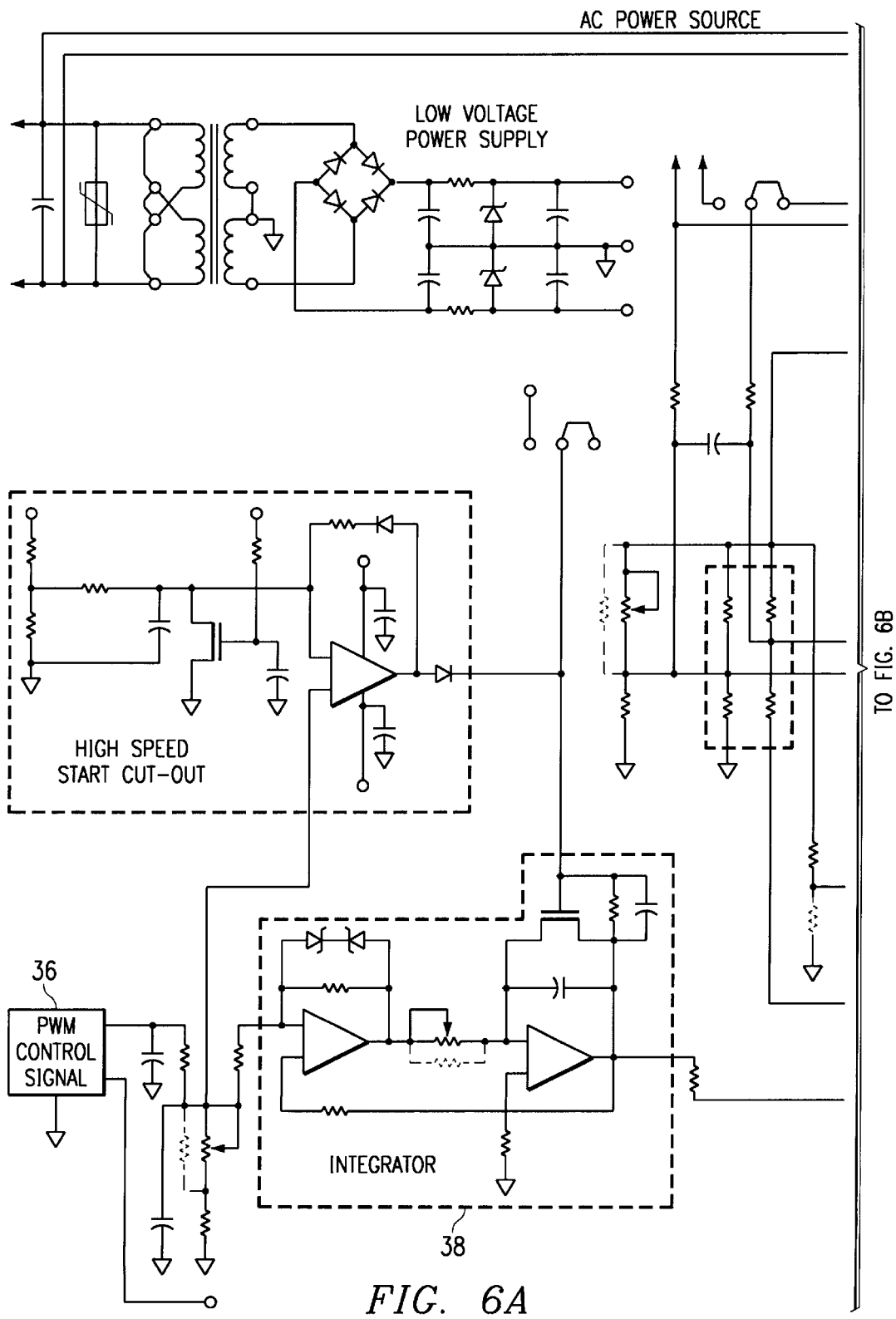
FIG. 6 is a detailed schematic of the DC motor drive control circuit according to the preferred embodiment of the present invention.
Figure 6B:
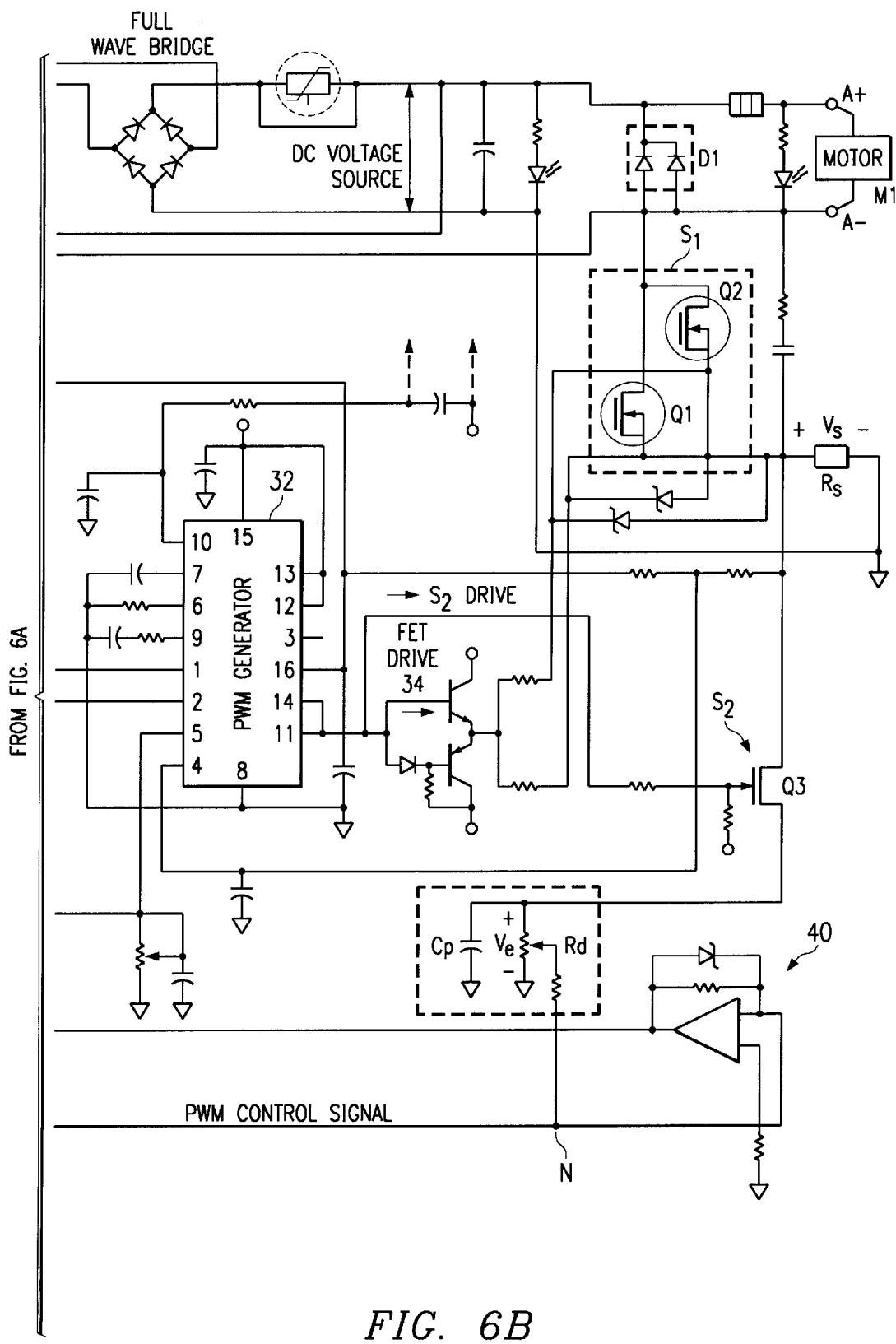

Referring now to FIG. 6, there is illustrated a detailed schematic including the power control circuit of FIG. 4 according to the preferred embodiment of the present invention. PWM control 32 is seen to comprise a PWM generator which preferably comprises an integrated circuit 30 having a part no 3524, and is manufactured by several manufactures including Unitrode and Linfinity. PWM generator 32 is seen to drive a pair of parallel connected power MOSFETs Q1 and Q2 via a FET drive circuit 34. When the output of pin 11 is high, FET drive circuitry 34 drives the base of the power MOSFETs Q1 and Q2 to turn S1 on, thus providing a voltage DC across the armature terminals A+ and A− of motor M1. When the output of PWM 32 at pin 11 is low, the FET drive circuitry 34 provides a low voltage to the base of the S1 MOSFETs to remove DC voltage from the motor armature terminals A+ and A−. Diodes D1 are free wheeling diodes providing a path for the motor current when the switch S1 is in the off position to sustain back EMF of the motor. The output of PWM 32 at pin 11 controls the duty cycle of S1 and the speed of motor M1.

It can be seen that pin 11 of PWM generator 32 also drives FET Q3 comprising switch S2 in synchronism with the power switch S1. Thus, when the FETs Q1 and Q2 of S1 are on, the FET Q3 of S2 is also on. S2 connects the voltage Vs established across the current sense resistor Rs to the parallel combination of Rd/Cp as previously described in reference to FIG. 4. Rd is seen to include both a potentiometer and a series resistor, whereby the potentiometer allows the total value of Rd to be selectively determined. Again, by adjusting the value of Rd, the voltage ripple of Ve across the combination of Rd/Cp can be adjusted. A PWM control circuit 36 provides a variable and selectable PWM control signal via an integrator 38 to node N. This PWM control signal is summed by an operational amplifier 40 with the voltage Ve established across Rd/Cp. This summed voltage is provided to Pin 1 of PWM 32 which is the current sense input of this integrated circuit. It is noted that the PWM generator control circuit 32 is referenced to the common negative rail, as is the voltage Vs established across the current sense resistor Rs, and thus, armature current sensing is achieved at the negative side of the power switching device S1, namely, the sources of FET Q1 and Q2.

In the preferred embodiment of the present invention, FETs are used as S1 and S2. However, it is recognized in the art that other similar switching devices could be used as well, such as isolated gate bipolar transistor (IGBT) or a silicon control rectifier (SCR). If these devices were used, control of these elements would be at the base of the transistor, and the gate of an SCR. The common element for the transistor would be the emitter, and the cathode for the SCR. It is intended that FETs, transistors, or SCRs or other suitable switches could be implemented as switching devices S1 and S2 as desired. Basically, the design of this power control circuit revolves around properly modulating the power devices to control the motors voltage, torque, etc.

Figure 1:
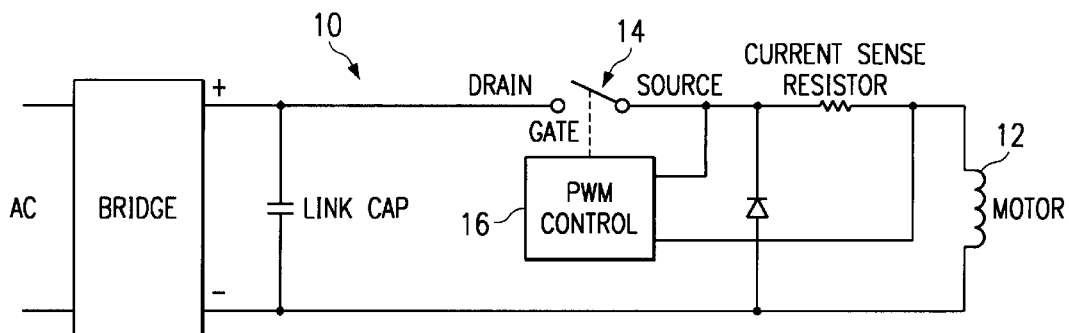
FIG. 1 is a schematic of a prior art DC motor drive control circuit controlled by a power FET arranged in a common source connection.
Figure 2:
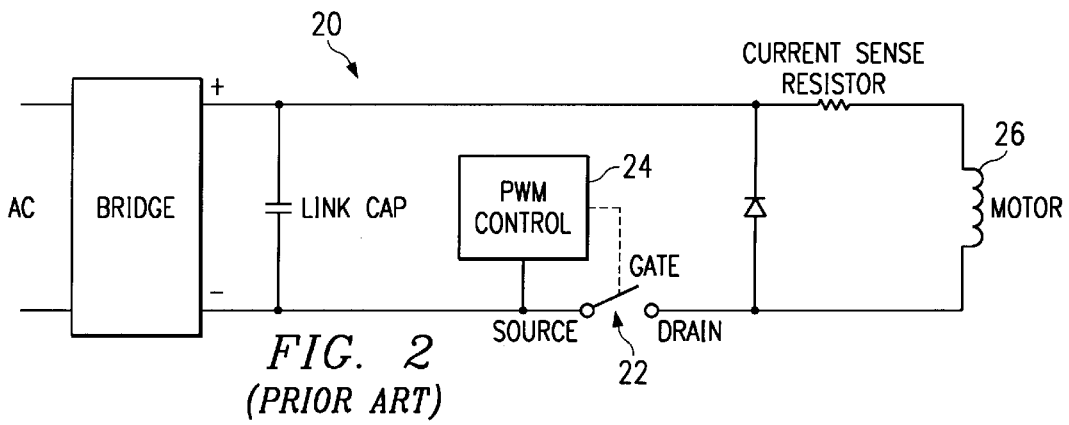
FIG. 2 is a schematic of another prior art DC motor drive control circuit having a power FET controlling a DC motor in a common drain connection.
Figure 3:
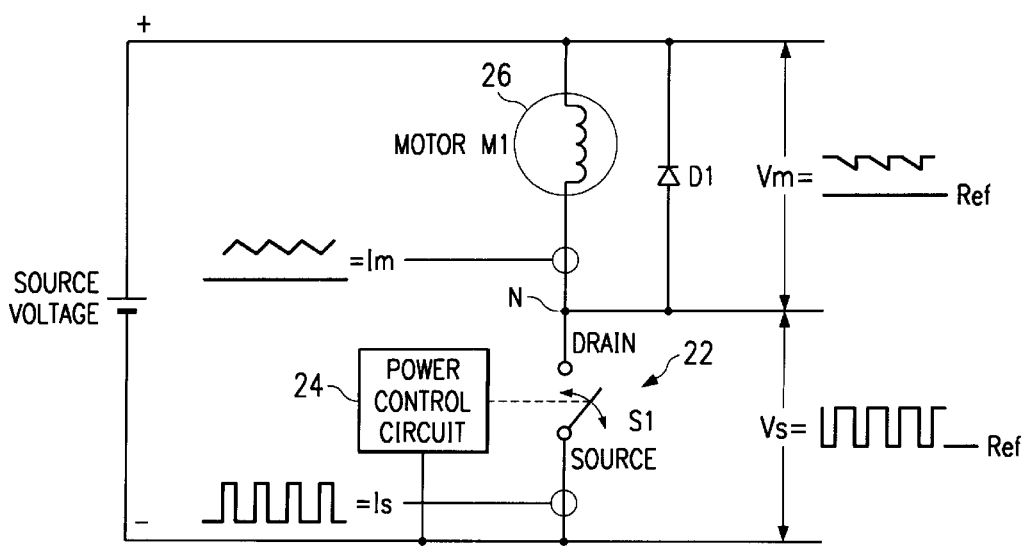
FIG. 3 is a schematic of the control circuit shown in FIG. 2 illustrating the motor voltage Vm and the switch voltage Vs and the associated currents therethrough when the switch is arranged in a common drain configuration.

If the DC voltage source is established by an AC source, which is typical, in combination with a rectifier, such as a four-wave bridge, this rectifying switching frequency is typically only 50 or 60 hertz, which is significantly less than the high PWM frequency generated by control 32. This lower rectifying frequency is a much less noise problem than the high frequency scheme shown in FIG. 1.

It is intended that other equivalent embodiments of the present invention could be provided as well for providing current sensing to PWM 32 when the power switch is off. For instance, capacitor Cp could be provided in parallel with current sense resistor Rs, and resistor Rd could be eliminated all together. (Jimmy could this be possible?) In this embodiment, PWM control circuit 32 turns S2 on when S1 is off to connect the voltage Vs across the current sense resistor Rs to the input of PWM control circuit 32.

Though the invention has been described with respect to a specific preferred embodiment, many variations and modifications will become apparent to those skilled in the art upon reading the present application. It is therefore the intention that the appended claims be interpreted as broadly as possible in view of the prior art to include all such variations and modifications.

We claim:

1. A control circuit for energizing a DC motor having a motor armature connected between
    a first terminal and a second terminal, comprising;
    a DC armature voltage source having a positive rail and a negative rail, said positive rail being coupled to the first terminal of the DC motor;
    a first switch connected in series with the motor armature, said first switch having a first contact connected to the second terminal of the DC motor and a second contact;
    a pulse width modulator operatively coupled to said first switch controlling an on time and off time of said first switch to control the average voltage across the motor armature, said pulse width modulator having a current sensing input;
    a second switch having a first contact coupled to said first switch second contact, and a second contact, said second switch being controlled by said pulse width modulator;
    a current sense resistor coupled between said first switch second contact and said voltage source negative rail; and
    a resistor/capacitor (RC) parallel combination having a first end coupled to said second switch second contact and a second end coupled to said voltage source negative rail, said RC combination first end being coupled to the current sensing input of said pulse width modulator.

2. The control circuit as specified in claim 1 wherein said pulse width modulator turns said first switch on and off in synchronism with said second switch.

3. The control circuit as specified in claim 2 wherein said resistor of said RC combination has a variable resistance to adjust an RC time constant of said RC parallel combination.

4. The control circuit as specified in claim 1 wherein said first switch comprises a FET having a source terminal being said second terminal.

5. The control circuit as specified in claim 4 wherein said second switch comprises a FET having a source terminal being said second terminal.

6. The control circuit as specified in claim 1 further comprising a pulse width modulation control signal generator generating a variable PWM control signal being coupled to said current sensing input of said pulse width modulator.

7. The control circuit as specified in claim 6 wherein said RC combination generates a current sensing signal that is summed with said variable PWM control signal to form a control signal, said control signal being coupled to said current sensing input of said pulse width modulator.

8. A control circuit for energizing a DC motor having a motor armature connected between a first terminal and a second terminal, comprising:
    a DC armature voltage source having a positive rail and a negative rail, said positive rail being coupled to the first terminal of the DC motor;

a first switch connected in series with the motor armature, said first switch having a first contact connected to the second terminal of the DC motor and a second contact;

a pulse width modulator operatively coupled to said first switch controlling an on and off time of said first switch to control the average voltage across the motor armature, said pulse width modulator having a current sensing input;

a current sense resistor coupled between said first switch second contact and said voltage source negative rail;

sensing means coupled to said current sense resistor for determining a current through said DC motor armature and generating a first signal indicative of and directly corresponding to said current through said DC motor armature, said sensing means providing said first signal to said pulse width modulator, said pulse width modulator controlling the on time of said first switch as a function of said first signal; and wherein said sensing means having a resistor/capacitor (C) parallel combination controllably coupled between said first switch second contact and said voltage source negative rail, and further coupled to said current sense resistor by a second switch, said second switch coupled between said first switch second contact and said RC parallel combination, said second switch being turned on and off by said pulse width modulator in synchronism with said first switch.

9. The control circuit as specified in claim 8 wherein said resistor of said RC combination has variable resistance.

10. The control circuit as specified in claim 8 wherein said first switch comprises a FET having a source coupled to said negative rail.

11. The control circuit as specified in claim 8 wherein said second switch comprises a FET having a source coupled to said pulse width modulator.

12. The control circuit as specified in claim 8 further comprising a capacitor connected in parallel with said current sense resistor generating said first signal.

13. The control circuit as specified in claim 8 wherein said first signal is an analog signal.

* * * * *